Figure 1:
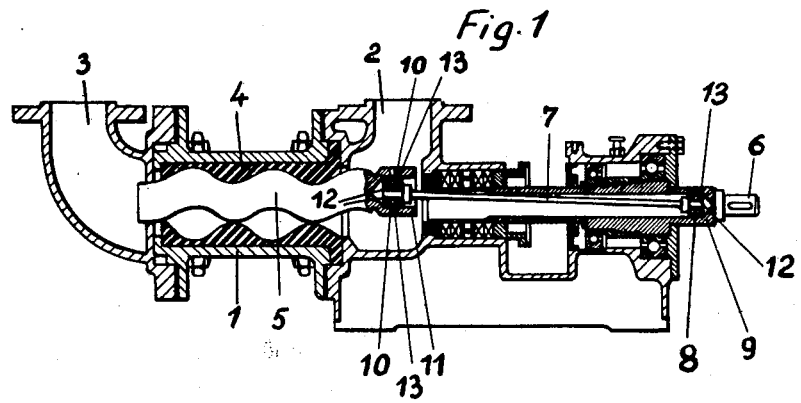

Jan. 12, 1965   J. STICKEL   3,165,065
FLEXIBLE COUPLING FOR SCREW PUMP ROTORS
Filed July 24, 1961   3 Sheets-Sheet 1

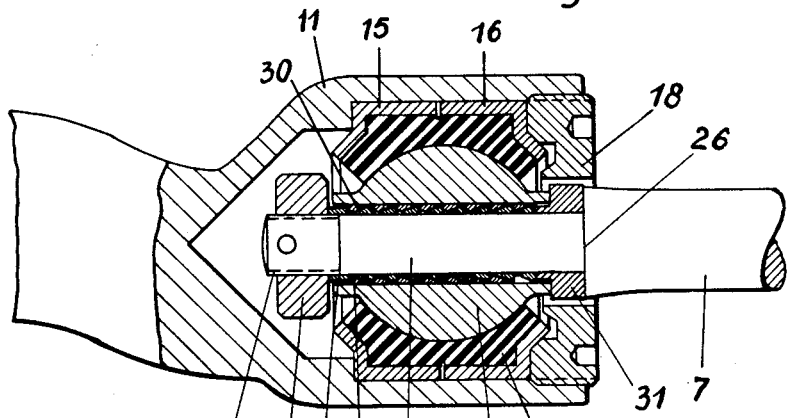
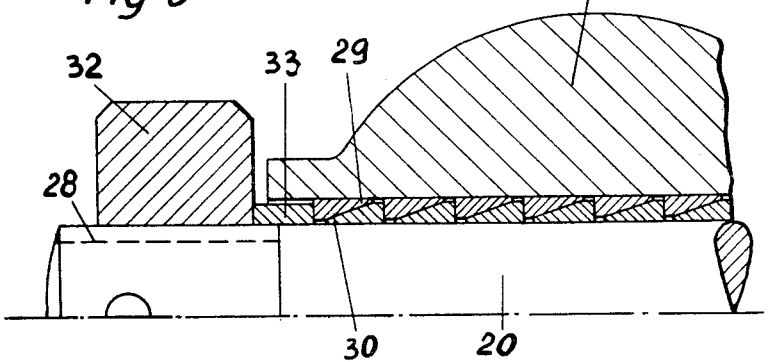
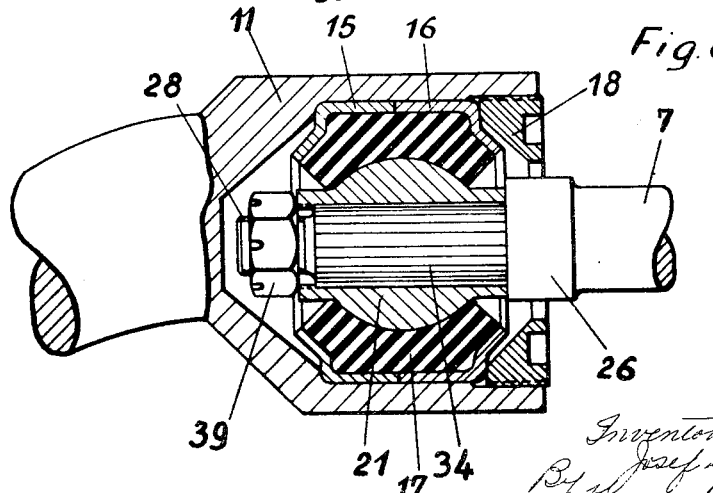

Jan. 12, 1965   J. STICKEL   3,165,065
FLEXIBLE COUPLING FOR SCREW PUMP ROTORS
Filed July 24, 1961   3 Sheets-Sheet 3
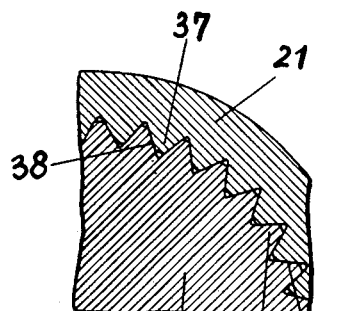
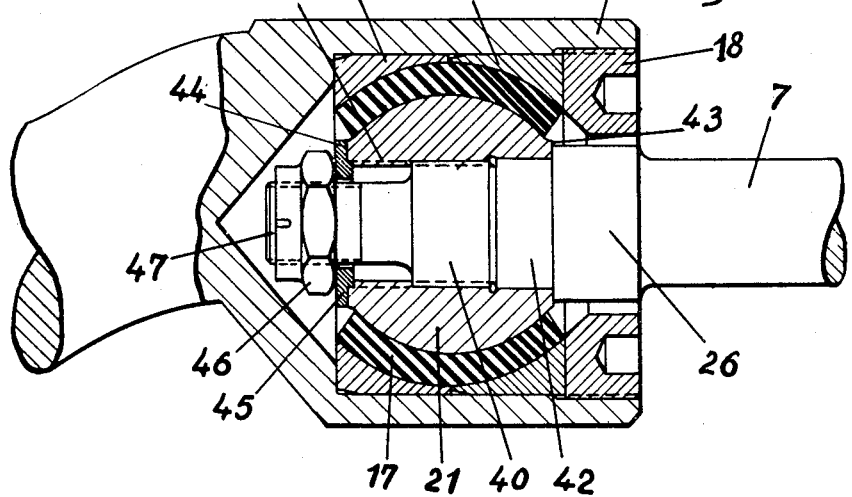
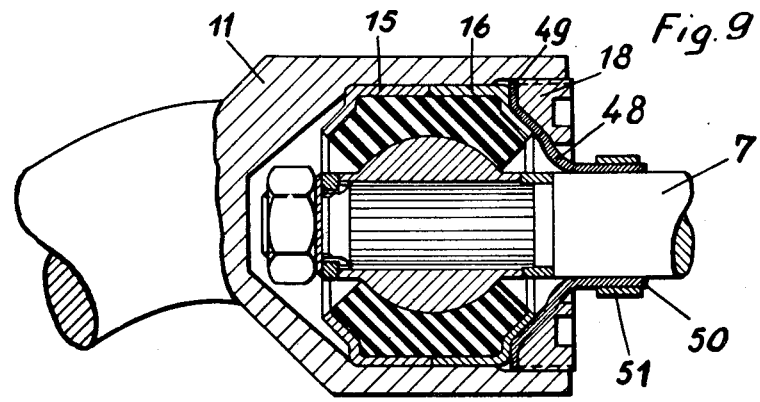
Inventor: Josef Stickel
By Kenyon, Palmer, Stewart
& Estabrook, Attorneys United States Patent Office 3,165,065
Patented Jan. 12, 1965

3,165,065
FLEXIBLE COUPLING FOR SCREW
PUMP ROTORS
Josef Stickel, Selb, Bavaria, Germany, assignor to Gebrüder Netzsch Maschinenfabrik, Selb, Bavaria, Germany, a firm
Filed July 24, 1961, Ser. No. 153,771
Claims priority, application Germany, July 26, 1960, N 18,682; Nov. 2, 1960, N 19,123; Apr. 13, 1961, N 19,883, N 19,884; May 20, 1961, N 20,075
7 Claims. (Cl. 103—117)

The invention relates to a screw pump with a stator and a rotor with a different number of turns and particularly to a pump the rotor head of which carries out an eccentric movement.

The stator of such pumps is usually made from non-metallic, elastic material such as rubber, while the rotor rotating therein is made from very hard metallic material, preferably steel. These two parts, which are in the form of a screw or helix, are of the same diameter throughout. When the stator is fixed in the pump housing, the rotor head carries out an eccentric movement. Consequently, in the known pumps a universal joint is introduced between the rotor head and the driving shaft. This solution is not, however, satisfactory.

According to the construction of the pump to which the invention relates, the power transmission from the driving shaft to the rotor is effected by an elastic joint introduced between the driving shaft and the rotor head, which joint compensates the eccentric movement of the rotor head.

The proposal according to the invention can be put into effect by providing the elastic joint with a link rod which is connected at both its ends through an elastic sleeve made, for example of rubber, to a hollow head of the rotor and to a hollow head on the driving shaft respectively. For this purpose a metallic inner sleeve can be fixed on the link rod and a counter sleeve also of metal in the hollow head, the intermediate elastic sleeve being vulcanized to both sleeves. Consequently the link rod can adapt itself to the eccentric movements of the rotor.

It is possible for the construction to be such that the inner sleeve is of spherical shape with a rubber cup fixed on it and this cup is surrounded by a two-piece counter sleeve of the hollow head whose parts can be pressed together and against the hollow head by axial pressure and at the same time be clamped together with the rubber cup held under continuous compression. For this purpose a pressure ring can be used which acts axially on the counter sleeve and is capable of being screwed into the hollow head. An inner ring acting in axial direction on the rubber cup can be coordinated to this pressure ring.

Figure 2:
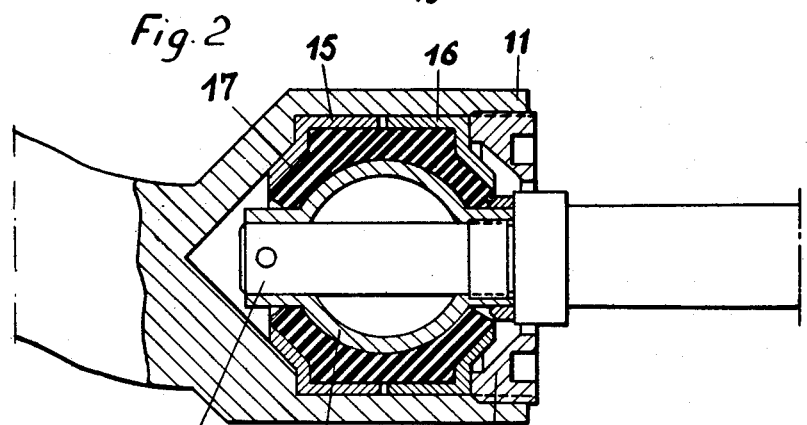
Figure 3:
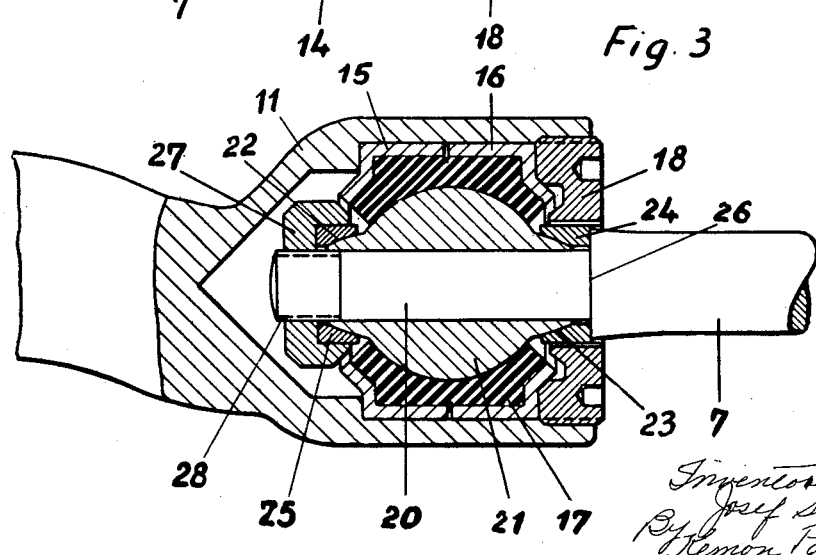

For such an elastic joint there are also other advantageous solutions, depending upon the demands that have to be met and solutions for solving the problem are hereinafter described by way of example with reference to the accompanying drawings, in which:

FIG. 1 is a longitudinal section through a screw pump;
FIG. 2 is a form of construction of the elastic joint according to the present invention;
FIG. 3 a modification of the construction of the elastic joint;
FIG. 4 an elastic joint of yet another form of construction;
FIG. 5 a part section of FIG. 4 on a larger scale;
FIG. 6 another form of construction in section;
FIG. 7 a part cross-section on a larger scale of a portion of FIG. 6 through the end part of the driving shaft and the inner metal sleeve;
FIG. 8 a section through another possible form of construction, and
FIG. 9 a section through yet another form of construction.

In a housing 1, provided with inlet connecting piece 2 and outlet connecting piece 3, a stator 4 made of elastic material, such as rubber, is fixed and a rotor 5 made from hard material, such as steel rotates therein. These two parts 4 and 5 are screw-shaped displacement elements. The stator and rotor have a different number of screw turns. The stator usually has one more turn than the rotor.

The drive of the rotor 5 by the driving shaft 6 is effected, according to the invention, through the intermediary of an elastic or flexible joint which on the one hand transmits the power and, on the other hand, compensates the eccentric movement of the rotor head.

According to FIG. 1, a link rod 7 is mounted in hollow drive shaft 6 and is driven by a rubber sleeve 8 in the hollow head 9 of shaft 6. The other end of link rod 7, through the intermediary of a similar rubber sleeve 10, imparts rotary motion to the hollow head 11 of the rotor 5. To each of these rubber sleeves 8 and 10 a metal inner sleeve 12, rigidly connected with the link rod 7, and a metal counter sleeve 13, rigidly mounted in the hollow head 9 and 11, are coordinated. The rubber sleeves 8 and 10 are vulcanized to their respective sleeves 12 and 13.

The elastic joint according to the invention may also be constructed as illustrated in FIG. 2. In this case a spherical sleeve 14 is fixed on each end of the link rod 7 and a counter sleeve composed of cup-shaped ring parts 15 and 16 is located in each of the two hollow heads 11 and 9. A rubber cup or shell 17 is provided between each counter sleeve 15, 16 and its sleeve 14 and adheres firmly to these sleeves.

After the link rod 7 has been introduced into the hollow heads with the elastic joint just described, the pressure ring 18 is screwed into the hollow head so that, on the one hand, it presses the cup-shaped ring parts 15 and 16 of the counter sleeve tightly together and, on the other hand, it clamps the rubber cup 17 between them and against the rounded end portions of spherical sleeve 14. Due to the elastic nature of the sleeve or cup 17, the axial movement of sleeve part 16 subjects the rubber cup 17 to continuous compression both axially and radially of the sleeve. Such compression holds the spherical sleeve 14 against appreciable displacement within the hollow head 11, either radially or axially, while permitting limited swinging of the axis of rod 7 about the center of spherical part 14.

According to the invention therefore the rotary movement of the driving shaft 6 is transmitted to the rotor 5 through the intermediary of elastic link members, whereby these link members at the same time compensate the eccentric deflection or movement of the rotor.

In the forms of construction illustrated in FIGS. 3 to 5, the construction is such that the force-locking connection of the inner metal sleeve is effected with the aid of conical rings under axial pressure. In this manner the clamping forces necessary for transmitting the torque between the driving shaft and the inner metal sleeve are produced without one of these two structural elements undergoing a reduction in cross-section and being weakened thereby. In addition the advantage is derived that the joint can be fitted in a very simple manner and is also very easy to dismantle for example when carrying out repairs. The effective conical surfaces according to the invention are subjected to practically no wear with the result that the joint has an exceptionally long life.

In the form of construction shown in FIG. 3, the inner metal sleeve 21 is mounted on the journal 20 of the link rod 7 and is of spherical shape. The sleeve 17 which is of elastic material such as rubber, is rigidly connected to this journal through the sleeve 21. The two sleeve parts 15 and 16 which form the outer metal sleeve are firmly connected with the rubber sleeve. The screw-threaded ring 18 serves for clamping the two outer metal sleeve parts 15 and 16 so that a force-locking connection is ensured between the rotor head 11 and the inner sleeve 21.

The inner sleeve 21 has two conical ends 22 and 23 which cooperate with internally conical pressure rings 24 and 25 which can be pressed axially one towards the other. The pressure ring 25 bears against a collar or shoulder 26 of the driving shaft 7 while the pressure ring 24 acts as a cover or cap nut 27 which can be screwed on to the screw thread 28 of the shaft journal 20.

If the nut 27 is tightened, the conical surfaces of the sleeve ends 22 and 23 on the one hand and the pressure rings 24 and 25 on the other hand are tightly pressed together.

Owing to the fact that the pressure ring is located in a cavity in the cap nut 27 it is axially guided and perfectly centered.

In the form of construction according to FIGS. 4 and 5, conical pressure rings 29 and 30 are inserted between the shaft journal 20 and the inner metal sleeve 21, which rings represent, so-to-speak, a sleeve introduced between the journal 20 and the sleeve 21 and mutually overlap as shown particularly in FIG. 5.

The number of pairs of conical rings can be adapted to the torque to be transmitted. The first pressure ring bears against a collar or shoulder 26 of the shaft 7 or a washer 31 placed in front thereof. The nut 32 screwed on to the thread 28 of the shaft journal 20 acts on the last pair of pressure rings, preferably through the intermediary of a washer 33.

When the pressure nut 32 is tightened, the whole set or pack of conical rings 29, 30 is compressed. Thereby the conical rings 30 on the shaft journal 20 press against this journal, whereas the outer conical rings press against the metal sleeve 21. In this manner a perfect force-locking connection is established between the journal 20 and the spherical sleeve 21.

Another object of the invention is to ensure perfect entrainment of the inner metal sleeve and consequently a perfect transmission of power between the driving shaft and the rotor head, whereby a connection is provided which is effective, irrespective of how much or whether the driving shaft turns in one direction or in the opposite direction. FIGS. 6 and 7 illustrate such a connection and show a construction in which the inner metal sleeve is provided with a non-circular internal profile while the end part of the driving shaft in which it is accommodated has a corresponding external profile, the metal sleeve being clamped between a collar or shoulder on the driving shaft and a pressure nut secured against rotation on the end of the driving shaft.

It has been found advantageous for the profiles of the metal sleeve and the driving shaft to be formed by axially parallel longitudinal ribs and grooves, these ribs and grooves being preferably of triangular cross-section. This provides a splined connection between the metal sleeve and the driving shaft.

This connection ensures in the simplest possible manner a perfect and unshiftable transmission of power in both directions. No additional transmission elements are required. Moreover no weakening of the structural parts in question occurs, as in the case when structural means such as wedges, dowel pins or the like are introduced for effecting the transmission.

The driving shaft or link rod 7 of FIGS. 6 and 7 has an end part 34 extending from the collar or shoulder 26 on which the inner metal sleeve 21 sits. This sleeve carries the rubber sleeve 17 which is tightly connected to it. The two sleeve parts 16 and 17 are firmly connected to the sleeve 17 and form the outer metal sleeve.

With the aid of the screw ring 18 the sleeve parts 15 and 16 can be so clamped that the force-locking connection between the inner metal sleeve 21 and the rotor head 11 is ensured.

The end part 34 of the driving shaft 7 has an external profile, as shown particularly in FIG. 7, which consists of axially parallel longitudinal ribs 35 and grooves 36. The metal sleeve 21 has a corresponding profile formed by the longitudinal ribs 37 and longitudinal grooves 38. FIG. 7 is a transverse section of engaging portions of sleeve 21 and shaft part 34 showing the interlocking non-circular profiles of these two parts.

These ribs and grooves are preferably of triangular cross-section as in the example illustrated, but it is obviously possible to make them polygonal or bulged.

The inner metal sleeve 21 is clamped in position for use between the collar or shoulder 26 and the pressure nut 39 which can be screwed on the threaded stem 28 on the end part 34 of the driving shaft 7. It can be locked against rotation in a suitable manner, for example by a key or the like.

The example illustrated in FIG. 8 is designed so that for constant force-locking connection the inner metal sleeve can be screwed on a screw-threaded journal of the driving shaft and clamped between a collar or shoulder of larger diameter than the screw-threaded journal and a pressure ring of a nut which can be screwed on a screw bolt at the end of the driving shaft and locked against rotation.

The construction is preferably such that a guide neck of larger diameter for receiving the inner metal sleeve extends from the screw-threaded journal and an abutment collar or shoulder of still greater diameter extends from this guide neck.

The inner metal sleeve can, according to the invention, be a perforated or through-bored ball which has perpendicular to the axis of its bore abutment surfaces for the abutment collar or shoulder of the driving shaft and for the pressure ring of the nut.

This connection between the driving shaft and the inner metal sleeve ensures not only a perfect, unshiftable transmission of power to the rotor head. It also presents the advantage that the inner metal sleeve is accurately centered on the guide neck of the shaft. Furthermore it is advantageous for this connection to be effective when the shaft rotates either in clockwise or in anticlockwise direction. In addition there is the advantage that no supplementary transmission elements are necessary and that the objection does not arise that the joint parts are weakened as is the case when wedges, dowel pins, keys or the like are employed.

The driving shaft 7 has extending from the collar or shoulder 26 a screw-threaded journal 40 on which the inner metal sleeve 21 sits. This sleeve carries the rubber sleeve 17 which is firmly connected to it. Both the metal parts 15 and 16 forming the outer metal sleeve are connected to the rubber sleeve 17.

With the aid of the screw ring 18 the sleeve parts 15 and 16 can be so clamped that the force-locking connection between the inner metal sleeve 21 and the rotor head 11 is ensured.

Extending from the screw-threaded journal 40 on which the metal sleeve 21 can be screwed with the aid of its internal thread 41 is a neck 42 which is of larger diameter than the journal 40 and serves for guiding and centering the sleeve 21. It is followed by a collar or shoulder 26 of still larger diameter against which the sleeve 21 bears with its abutment surface 43 when in position of use.

On the other end face the pressure ring 45 bears against the abutment surface 44 of the sleeve and the nut 46 mounted on the screw-threaded journal 47 acts on this ring. The nut 46 can be secured against rotation when in clamping position in a suitable manner for example by means of a key or the like.

In the case of such joints a perfect yet simple packing is important.

It has already been proposed, as provided in the case of the examples described, to provide an elastic sleeve which is slipped over the outside of the rotor head and secured on the driving shaft. An objection is, however, that this slip-on sleeve is subjected to very strong fulling action owing to its large diameter and its length, so that its life is not of very great duration.

Another suggestion, namely to provide slide ring packings was likewise not satisfactory because these packings were subject to considerable wear and had to be renewed after being in use a relatively short time.

In order to overcome this, the construction is such that for packing the elastic joint a protective flexible diaphragm with a disc-shaped edge is placed on the end of the driving shaft so that it bears against the joint and this diaphragm has a central neckpiece which is secured on the driving shaft.

When, as in the examples described, the joint consists of a metal inner sleeve on the driving shaft, a two-piece metallic counter sleeve on the hollow head of the rotor and an intermediate elastic sleeve, for example of rubber, the construction is preferably such that the disc-like part of the diaphragm is clamped between the counter sleeve and the pressure ring serving for fixing it and the neck-shaped part of the diaphragm is secured outside the joint by a guard ring on the driving shaft.

The packing according to the invention is characterized in that a relatively small protecting diaphragm is required which is limited to the surface packing of the parts exposed to danger, because it is only the small surface of the joint facing the medium being dealt with that is subjected to the action of the medium. This surface is, according to the invention, covered by the disc-shaped part of the diaphragm which can be made of rubber or similarly acting material, especially synthetic material.

Thus the particular advantage is attained that the fixing of the protecting diaphragm is effected by the pressure ring, which is present and necessary in any case, for tightly clamping together the two parts of the outer sleeve of the joint.

According to FIG. 9, the protecting diaphragm 48 which bears with its disc-shaped part 49 against the parts 15 and 16 of the counter sleeve, is provided for the packing. When the pressure ring 18 is tightened, the diaphragm disc portion 49 is clamped between this ring and the counter sleeve 15, 16. Consequently a force-locking fixation of the diaphragm and also a perfect sealing are ensured.

The diaphragm 48 merges into a central neck part 50 which is fixed on the driving shaft 7 outside the joint. It is advisable to slip the sleeve or neck part 50 of the diaphragm 48 on to the driving shaft 7 under a suitable initial stress. If necessary the neck part 50 can be also anchored in position by means of a tight gripping guard ring 51. It is clear from the drawing that FIG. 9 is a modification of FIG. 6 and includes the same non-circular profile coupling between the spherical sleeve 21 and the shaft section 34.

In all the modifications disclosed herein, the inner sleeve 14 and 21, rigidly secured to the end of link-rod 7, and having an enlarged spherical portion, constitutes an enlargement of the link-rod 7 located within the hollow end-portion of the rotor 5.

In the appended claims the term "rubber-like material" includes natural and synthetic rubber and equivalent materials.

It will be noted that in all modifications described herein the flexible coupling element interposed between the enlarged head portion 11 of the screw-rotor and the end of the driving shaft 7 is formed of a unitary assembly consisting of cup-shaped rings 15 and 16 surrounding opposite ends of the elastic sleeve 17 which embraces the inner metallic sleeve 21. This assembly is insertable as a unit into the cylindrical cavity formed in the end of the enlarged head portion 11 of the screw-rotor, and it is held within this cavity by means of the ring 18 threaded in the end of the cavity. Also, the flexible coupling assembly is removably mounted on the shaft 7 by a splined connection which prevents relative rotation between the coupling assembly and the drive shaft 7, and the coupling assembly is held against axial movement by a suitable clamping nut.

I claim:

1. In a screw-pump in which the screw-rotor of the pump is driven from a driven shaft rotating on a fixed axis through a link-rod connected between the drive shaft and the rotor, an improved flexible coupling between said link-rod and said rotor comprising, a hollow head-portion formed integrally on the end of said rotor and located within the fluid passage of said screw pump, said head-portion having a cylindrical cavity formed in the end thereof and receiving an end portion of said link-rod, an enlarged metallic sleeve surrounding the end portion of said link-rod located within said cylindrical cavity and having a splined connection with said link-rod, an elastic sleeve formed of rubber-like material located within said hollow head-portion and embracing said enlarged metallic sleeve, a pair of cup-like rings surrounding the end portions of said elastic sleeve and having outside diameters to have close-fitting contact with the inner wall of said cylindrical cavity, means securing the inner surface of said elastic sleeve against turning with respect to said metallic sleeve, the assembly comprising said rings, elastic sleeve and metallic sleeve being insertable as a unit through the open end of said cylindrical cavity, and a pressure ring threaded into the end of said cylindrical cavity to exert continuous axial pressure on said elastic sleeve.

2. A flexible coupling according to claim 1 wherein said cup-shaped rings have their inner surfaces bonded to the end portions of said elastic sleeve and are spaced apart in the relaxed state of said elastic sleeve.

3. A flexible coupling according to claim 1 and including a flexible diaphragm of conical shape surrounding said drive shaft and having the smaller peripheral edge secured to said drive shaft in fluid-tight relation, and the larger peripheral edge of said conical diaphragm being clamped between said pressure ring and one of said cup-shaped rings, to effect fluid-tight sealing of said flexible coupling from the fluid transmitted through the screw pump.

4. A flexible coupling according to claim 1 wherein said splined connection between said metallic sleeve and said link-rod comprises longitudinal ribs formed about the end portion of said link-rod located within said metallic sleeve and mating with longitudinal grooves formed about the inner surface of said metallic sleeve.

5. A flexible coupling for coupling adjacent ends of two aligned shafts comprising, in combination, a hollow head-portion on the end of one shaft and having a cylindrical cavity in the end thereof receiving an end portion of the other shaft, said cylindrical cavity having a smooth-wall portion of uniform diameter throughout its length, a metallic enlargement on the end portion of said other shaft located within said hollow head-portion, an elastic sleeve formed of rubber-like material located within said hollow head-portion and embracing said enlargement of said other shaft, said metallic enlargement having a spherical outer surface bonded to the inner surface of said elastic sleeve, a pair of cup-shaped metallic rings surrounding the end portions of said sleeve in spaced relation, the inner surfaces of said cup-shaped rings being bonded to the outer surface of said elastic sleeve, each cup-shaped ring having a cylindrical wall portion in close fitting contact with the smooth-wall portion of said cylindrical cavity, and a pressure ring threaded into the end of said hollow head-portion and exerting continuous pressure tending to force said two cup-shaped rings together, thereby subjecting said elastic sleeve to continuous compression both radially and axially of said metallic enlargement.

6. A flexible coupling according to claim 5 and including a flexible diaphragm of conical shape surrounding said drive shaft and having the smaller peripheral edge secured to said drive shaft in fluid-tight relation, and the larger peripheral edge of said conical diaphragm being clamped between said pressure ring and one of said cup-shaped rings, to effect fluid-tight sealing of said flexible coupling from the fluid transmitted through the screw pump.

7. A flexible coupling according to claim 5 wherein said metallic enlargement is a metallic sleeve having a splined connection with said other shaft comprising longitudinal ribs formed about the end portion of said other shaft located within said metallic sleeve and mating with complemental longitudinal grooves formed about the inner surface of said metallic sleeve.

References Cited in the file of this patent

UNITED STATES PATENTS

| | | |
|---|---|---|
| 1,940,884 | Rosenberg | Dec. 26, 1933 |
| 1,940,886 | Rosenberg | Dec. 26, 1933 |
| 2,028,407 | Moineau | Jan. 21, 1936 |
| 2,267,459 | Hait | Dec. 23, 1941 |
| 2,464,011 | Wade | Mar. 8, 1949 |
| 2,512,765 | Byram | June 27, 1950 |
| 2,532,145 | Byram | Nov. 28, 1950 |
| 2,625,018 | Dunn | Jan. 13, 1953 |
| 2,731,813 | Sampson | Jan. 24, 1956 |
| 2,737,119 | Hill | Mar. 6, 1956 |
| 2,915,979 | Bourke et al. | Dec. 8, 1959 |
| 2,924,180 | Bourke et al. | Feb. 9, 1960 |
| 3,011,445 | Bourke | Dec. 5, 1961 |

FOREIGN PATENTS

| | | |
|---|---|---|
| 864,388 | Great Britain | Apr. 6, 1961 |